May 16, 1933.  A. JOHNSON  1,909,541

ICE CREAM DISPENSING MACHINE

Filed Nov. 14, 1932  4 Sheets-Sheet 1

Axel Johnson INVENTOR.
BY Harry C. Schroder ATTORNEYS.

May 16, 1933.　　　A. JOHNSON　　　1,909,541

ICE CREAM DISPENSING MACHINE

Filed Nov. 14, 1932　　　4 Sheets-Sheet 3

INVENTOR.
Axel Johnson
BY
Harry C. Schroeder
ATTORNEYS.

May 16, 1933.  A. JOHNSON  1,909,541
ICE CREAM DISPENSING MACHINE
Filed Nov. 14, 1932   4 Sheets-Sheet 4

Patented May 16, 1933

1,909,541

UNITED STATES PATENT OFFICE

AXEL JOHNSON, OF OAKLAND, CALIFORNIA

ICE CREAM DISPENSING MACHINE

Application filed November 14, 1932. Serial No. 642,757.

This invention is an ice cream dispensing machine and has special reference to a device which may be installed in any type of freezing device, and which will apportion ice cream or other frozen delicacies.

The usual method of apportioning ice cream is by the use of the usual ice cream scoops or forming the ice cream in small cakes and slicing to the desired size by means of knives or wire frames, in which case the individual slabs of ice cream must be handled separately and cut into the usual portions. In the use of the usual scoop, the ice cream is packed, due to the compression of the ice cream causing a shrinkage during the dispensing thereof.

It is the main object of this invention to provide a machine which will automatically slice and apportion ice cream or other frozen delicacies without compression or shrinkage of the material, and which will apportion the ice cream as required.

Another object of the invention is to provide a machine in which a cake of the material to be apportioned may be inserted in the machine, after which the machine is hand controlled to apportion the ice cream as required.

A further object of the invention is to provide a machine which will apportion the ice cream in portions of exact size, ready for dipping in a coating medium when such coating medium is desired.

Other objects and advantages of the invention will become apparent as the following description is read on the drawings forming a part of this specification, and in which similar reference characters are used to indicate similar parts throughout the several views, of which:—

Figure 1:
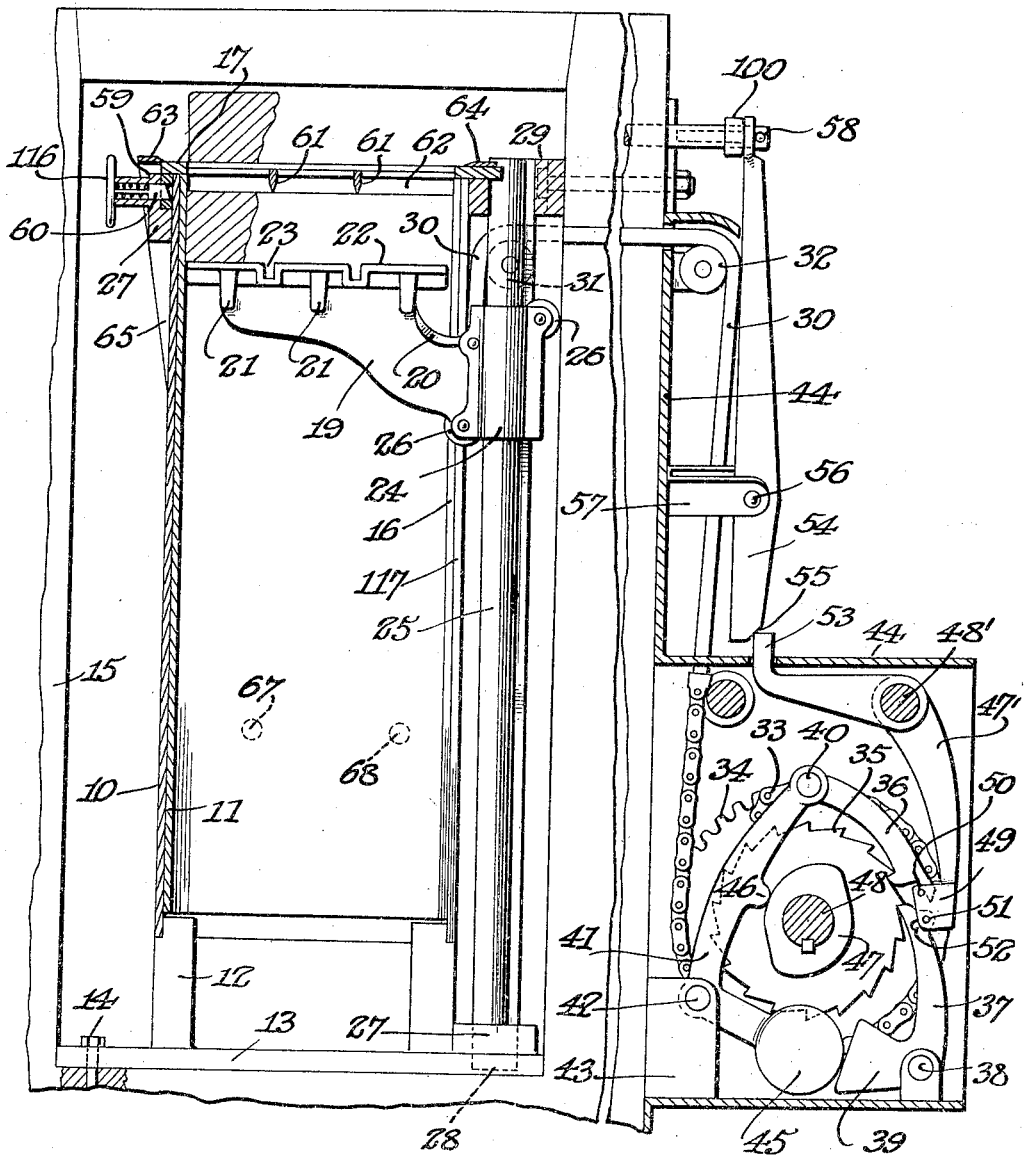
Fig. 1 is a sectional side elevation through the invention, showing the elevating mechanism and control means therefor.

The invention consists primarily of a hopper in which a carton of ice cream may be inserted, the hopper being provided with suitable securing means for the carton to prevent its movement relative to the hopper, together with means for forcing the ice cream bodily from the carton, means for cutting the body of ice cream into slices transversely and means for cutting the slices into a plurality of uniform portions, together with driving means for this mechanism.

The hopper consists preferably of a sheet metal receptacle 10 of rectangular form, in which a carton 11 is slidably received, this being the carton containing the ice cream to be apportioned. The hopper is suitably secured to a pedestal 12, this pedestal being integral with the base 13, the base being provided with suitable means for securing to the bottom of a refrigerating element as indicated at 14, the refrigerating element being indicated at 15 fragmentarily.

The hopper 10 is just the proper size to slidably receive the cartons 11, and the carton 11 is preferably provided with a weakened strip 16, which is to be removed previous to the insertion in the hopper 10, this particular type of carton being included in my co-pending application, Serial Number 638,083 filed October 17, 1932, or special means may be provided in this machine for slitting through the side of the carton during the operation of the machine. The carton is retained within the hopper by cooperation of the head 17 with the top edge of the carton, or may be retained by the means shown in my co-pending application above referred to. As will be noted, the bottom 18 of the carton is removable, and is to be removed previous to placing the cartons in the hopper.

The feeding means for the ice cream, and which urges the body of ice cream upwardly out of the carton progressively consists of an arm 19 which extends through the slot 16 provided in the carton where the slot is provided, a suitable slot being provided in the hopper 10 for passage of this arm, and in the event that the slot 16 is not provided, the arm is provided with a cutting edge 20, which slits through the side of the carton as the arm moves upwardly. This arm is provided with a plurality of transverse supports 21, on which is freely supported a platen 22, this platen being provided with crossing knife receiving recesses 23. This platen being removable, permits convenient cleaning thereof after the body of ice cream has been apportioned and dispensed.

The arm 19 is fixedly mounted on a slide 24, the slide being movable on a guide 25 and being provided with rollers 26, these rollers being adapted to reduce the friction between the slide and the guide, the guide being suitably supported in the base 13 and collar 27 as indicated at 28 and 29.

The operating mechanism for the slide 24 consists of a chain or other flexible member 30 which has one end fixed to the slide, and which passes over rollers or sprockets 31 and 32 which are suitably supported, the other end of the chain being fixedly secured as at 33 to a sprocket 34, so that rotation of the sprocket 34 in one direction will raise the arm 19, and in the other direction will permit this arm to lower.

The driving mechanism for the sprocket 34 consists of a ratchet 35, which is fixedly secured to the sprocket 34, a feeding pawl 36 cooperating with the ratchet to cause the upward movement of the arm 19 through the chain 30. A stop pawl 37 prevents retrograde movement of the ratchet, is pivoted at 38, and retained in cooperation with the ratchet by means of a counter-weight 39.

The pawl 36 is pivoted at 40 to bell crank lever 41, this bell crank lever being pivoted at 42 to a bracket 43 fixed to the housing 44, the other arm of the bell crank lever being provided with a counter-weight 45 for take-up action on the ratchet 35. Lever 41 is also provided with a projection 46, or a roller for cooperation with the cam 47, this cam being fixed on the shaft 48, the ratchet 35 and sprocket 34 being rotatably mounted on the shaft 48, whereby rotation of the shaft rotates the cam, and by cooperation with the projection 46, forces the lever 41 in counter-clockwise direction, as shown in Fig. 1, the pawl 36 drawing the ratchet in the same direction and also moving the sprocket in the same direction, raising the arm 19 and coincidently the platen 22, this cam being so formed as to feed the angular distance of one tooth on the ratchet for each half revolution.

By this means, the platen is raised progressively at each half revolution of the shaft 48, the cam being provided with an idle portion during which the cutting elements operate.

The means for releasing the platen and arm consists of a bell crank lever 47' which is pivoted at 48', one terminal of the lever being provided with a spanning head 49, this head spanning the pawls 36 and 37, the terminal end of the pawl 36 being pivoted thereto at 50, and a pivot 51 in the head 49 cooperating with a slot 52 in the terminal end of the pawl 37, whereby operation of the bell crank lever 47' will completely disengage the pawl 36 from ratchet 35 before pawl 37 is released, and also will permit free operation of the pawl 37 during an inoperative period of the pawl 36. The other end of lever 47' is provided with a dog 53 for cooperation with the intermediately pivoted lever 54, this lever being provided with a cam face 55, and the lever being pivoted at 56 in a bracket 57 fixed to the housing 44. The upper end of lever 54 has rotatably mounted therein, a shaft 58 which shaft is extended to a remote point for control of the machine, whereby the movement of the shaft 58 to the left will force the end 53 of lever 47 down, and retract the head 49, withdrawing both pawls from engagement from the ratchet 35, releasing the sprocket 34 and permitting the platen to be moved to its lowermost position for reloading of the machine.

The apportioning means consists of a head 17, this head being suitably supported on the collar 27, suitable aligning means 59 being provided. Securing means in the form of latches 60 are provided for securing the head on the member 27, to permit removal of the head for loading the machine and removal of the empty carton. Fixedly mounted on the head 17 are longitudinal knives 61 and transverse knives 62, these knives forming a plurality of rectangular cutting edges for apportioning the slices of ice cream previous to slicing, these knives being active during the upward feeding of the ice cream by the platen 22, which pushes the body of ice cream through the crossing knives, forming a series of rectangular sections of ice cream.

The slicing means consists of two knives 63 and 64 which slidably cooperate with the top surface of the head 17, passing over the knives 61 and 62 to slice off the apportioned section of the ice cream, the knives 63 and 64 just meeting at the center, and being reciprocally operated by the levers 65 and 66, which levers are pivoted at 67 and 68 on each side of the hopper 10, there being two levers 65 cooperating with opposite ends of the knife 64 and two levers 66 cooperating with the opposite ends of the knife 63, the top surface of the head 17 being arcuately formed as indicated at 69 and 70, and conforming to the reciprocal travel of the knives 64 and 63.

The operating means for the levers 65 and 66. consists of two bars 71 and 72, these bars being provided with recesses 73 and 74 for cooperation with the ends 75 and 76 of the levers, and to compensate for difference in vertical distance between the pivots 67 and 68 and the ends 75 or 76 during the oscillating motion of the levers. The bars 71 and 72 are slidable relative to the base 13, and are actuated by means of cam levers 77 and 78 which are respectively pivoted at one of their ends as indicated at 79 and 80, the other ends being pivotally connected to the bars 71 and 72 as indicated at 81 and 82.

Figure 3:
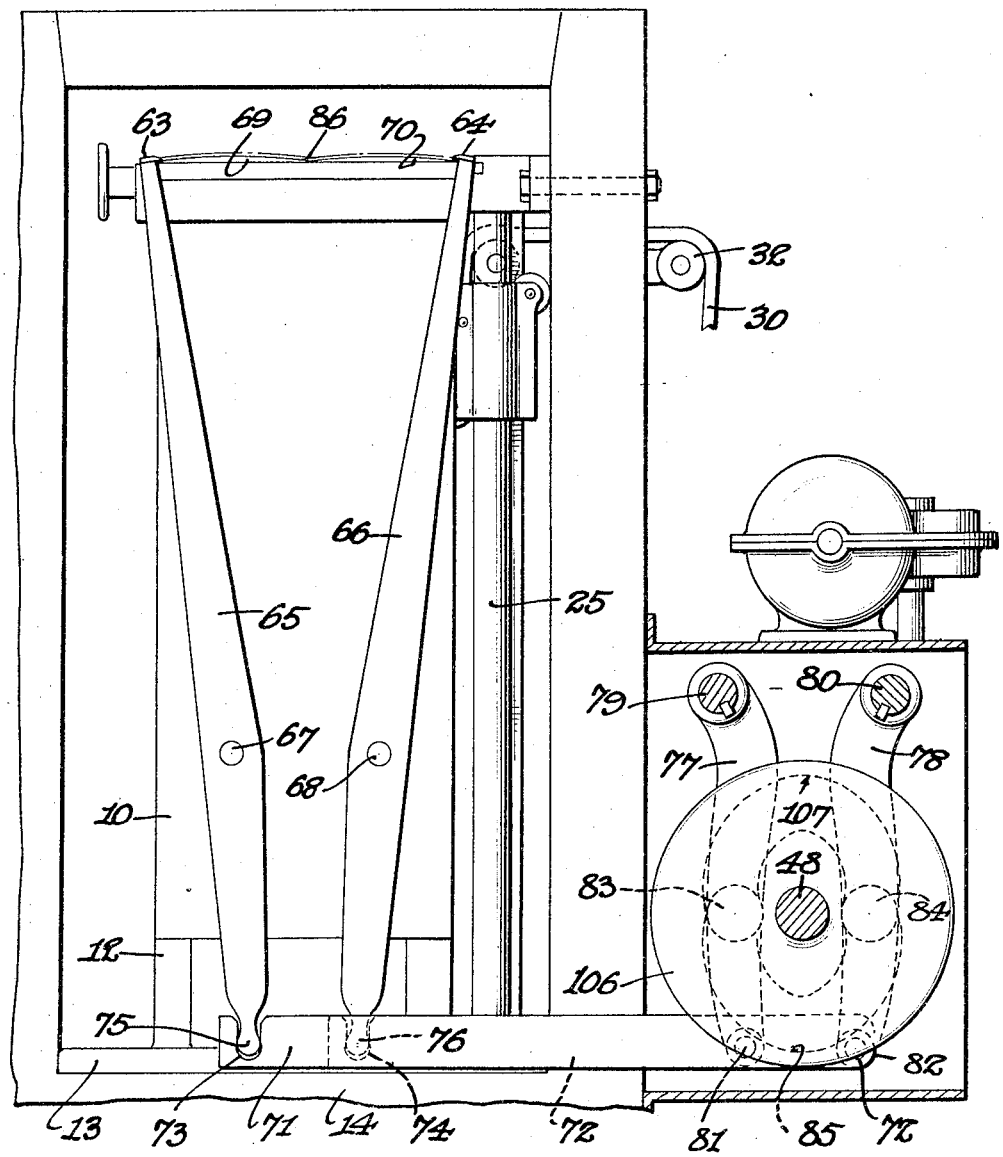
Fig. 3 is a side elevation of the invention, with the end cover plate removed.
Figure 4:
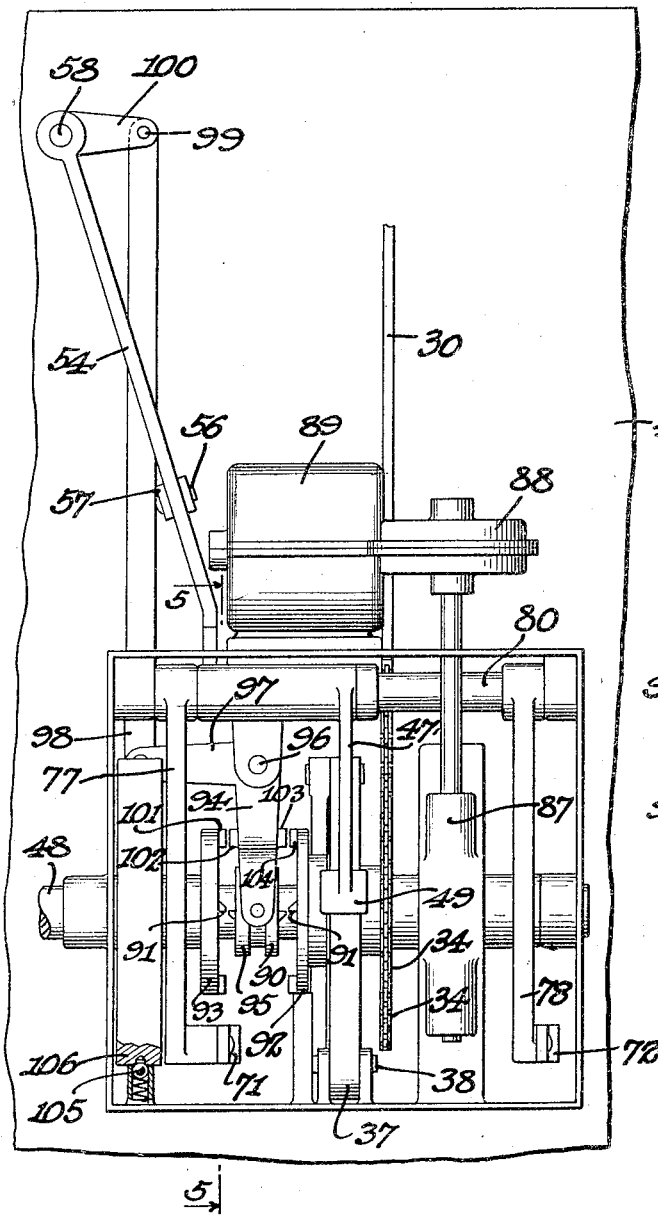
Fig. 4 is an end elevation of the operating mechanism and drive.
Figure 6:
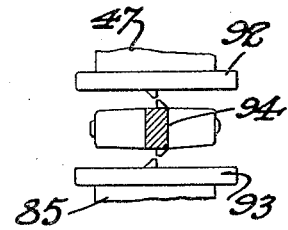
Fig. 6 is a section taken on line 6—6 of Fig. 5.
Figure 5:
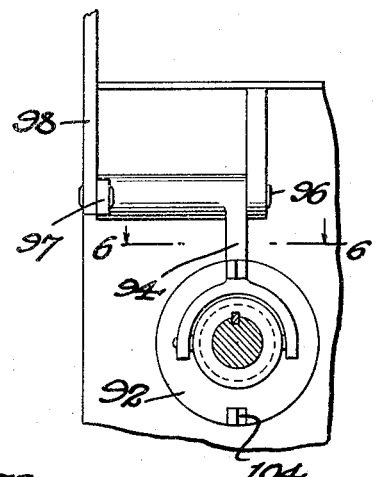
Fig. 5 is a section taken on line 5—5 of Fig. 4.

The levers 77 and 78 are provided with rollers intermediate their pivotal ends and indicated at 83 and 84, these rollers cooperating with a cam 85, which cam forces the two levers 77 and 78 apart, once for each half revolution of the shaft 48 on which the cam is rotatably mounted. It will be noted by this arrangement, with the rotation of the cam 85, that lever 77 is moved in clockwise direction and lever 78 in a counter clockwise direction drawing bar 72 to the right and pushing bar 71 to the left, as viewed in Fig. 3, the movement of bar 72 to the right swinging lever 66 about the pivot and moving knife 64 to the left to the center 86, while lever 65 moves knife 63 to the right, cutting through the apportioned section of the ice cream, and the cam 85 being so timed on the shaft 48, whereby the movement of the bars 72 and 71 follow immediately after the upward feeding movement of the platen 22.

The mechanism so far described is driven through suitable reduction gearing indicated at 87 and 88 by means of a motor 89. The control mechanism for the cam 85 consists of a clutch block 90, which is slidably and non-rotatably mounted on a shaft 48 and which is provided with suitable engaging teeth for cooperation with the teeth 91 on the companion clutch members 92 and 93, the clutch block 90 not being adapted for simultaneous engagement with both members 92 and 93. The companion clutch member 92 is secured to or integral with the cam 47, its specific purpose being to drive this cam, while the companion clutch member 93 is secured to or integral with the cam 85.

The clutch block 90 is controlled by means of a lever 94, the lever 94 having a yoke end spanning the cam 90, and pins cooperating with the annular recess 95, to permit rotation of the clutch block relative to the lever 94. Lever 94 is pivoted at 96 and is of the bell crank type, having a right angularly relative arm 97, to the end of which is pivotally secured a pull rod 98, the other end of the pull rod 98 being pivotally connected at 99 to a lever 100, this lever being fixedly secured on the shaft 58, whereby rotation of a shaft 58 in opposite directions, will cause engagement of the clutch block 90 with the respective companion members 92 and 93.

Automatic release or disengaging means for the clutch 90 is provided by means of the cooperating beveled lugs 101 and 102 formed respectively on the companion member 93 and lever 94, and the cooperating beveled lugs 103 and 104 formed respectively on the other side of the lever 94 and the companion member 92, the companion members 92 and 93 carrying two diametrically disposed beveled lugs each, so that the clutch will be disengaged after one half revolution.

Positioning and retaining means for the cams 47 and 85 are provided in the form of resiliently urged pawls 105 cooperating with suitable recesses formed in the drum 106, this drum forming an integral part of the cam 85, this cam having an exterior cam face 107 for returning the knives 63 and 64 to open position, whereby the knives 63 and 64 are positively actuated for both opening and closing movements.

The pivot 99 is fixedly secured in the pull rod 98, and slidable and rotatable in the lever 100, whereby the shaft 58 may be moved axially and the lever 100 will permit such movement by being slidable on the rod 99. A suitable guide 108 is provided to retain the rod 98 in relative position. The shaft 58 is slidably and rotatably mounted in the cabinet 109 as indicated, and extends to a remote point for operation, this point being located in the most convenient location for control of the machine. The control mechanism is governed by a locking device which consists of a handle 110 which is fixedly secured on the end of shaft 58, this handle having a dependent integral member 111 which normally clears the bracket 112, to permit rotation of the shaft 58. The bracket 112 has a recess 113 formed therein, and is fixedly secured to the cabinet as indicated at 114, the clearance 115 permitting the pin 111 to swing about the axis 58 in two directions to permit operation of the clutch block 90 in both directions. By this means, when the handle 110 is adjacent to the cabinet 109, this handle may be swung or moved in either direction rotationally, to cause the clutch block 90 to selectively engage with the companion members 92 and 93, but if the handle 110 is drawn outwardly to release the pawls 36 and 37, the handle 110 is locked by cooperation of the depending pin 111 with the recess 113, this locking feature being of prime importance as the release of these pawls is only required at such time as the body of ice cream has been completely dispensed and a new block of ice cream is to be placed in the hopper, this locking mechanism forming a safety device against the accidental operation of the knives 63 and 64 while loading the machine.

The machine is operated as follows:—

Figure 2:
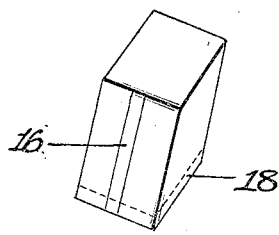
Fig. 2 is a perspective view of the carton or container for the ice cream.

The latching mechanism 116 is released, and the head 17 together with the slitting knives 61 is removed. The block of ice cream or other frozen dessert, stored in a container such as that shown in Fig. 2 is placed in the hopper 10 after removing the bottom 18 of the container, and removing the removable strip 16, the side of the container having the removable strip 16 coinciding with the side of the hopper having the recess 117 through which the arm 19 operates. The handle 110 is drawn outwardly from the side of the cabinet, which through lever 54 acting on the end 53 and lever 47, and thence through the spanning head 49, releases the operating pawl 36 and the retaining pawl 37 from the ratchet 35, freeing the sprocket 34 and permitting the platen 22 to be moved to the bottom of the hopper 10, as the container is placed in the hopper and forced downwardly. With the container in position, the head 17 is replaced and locked by means of the latching means 60, the knives 63 and 64 being normally retracted sufficiently far to permit removal of the head.

The head 17 cooperates with the top edge of the container, thereby retaining the container against longitudinal movement, while the opening in the head, being coextensive with the cross-sectional interior area of the container, will permit the ice cream to be forced from the container through the opening in the head.

Figures 7, 8, 9:
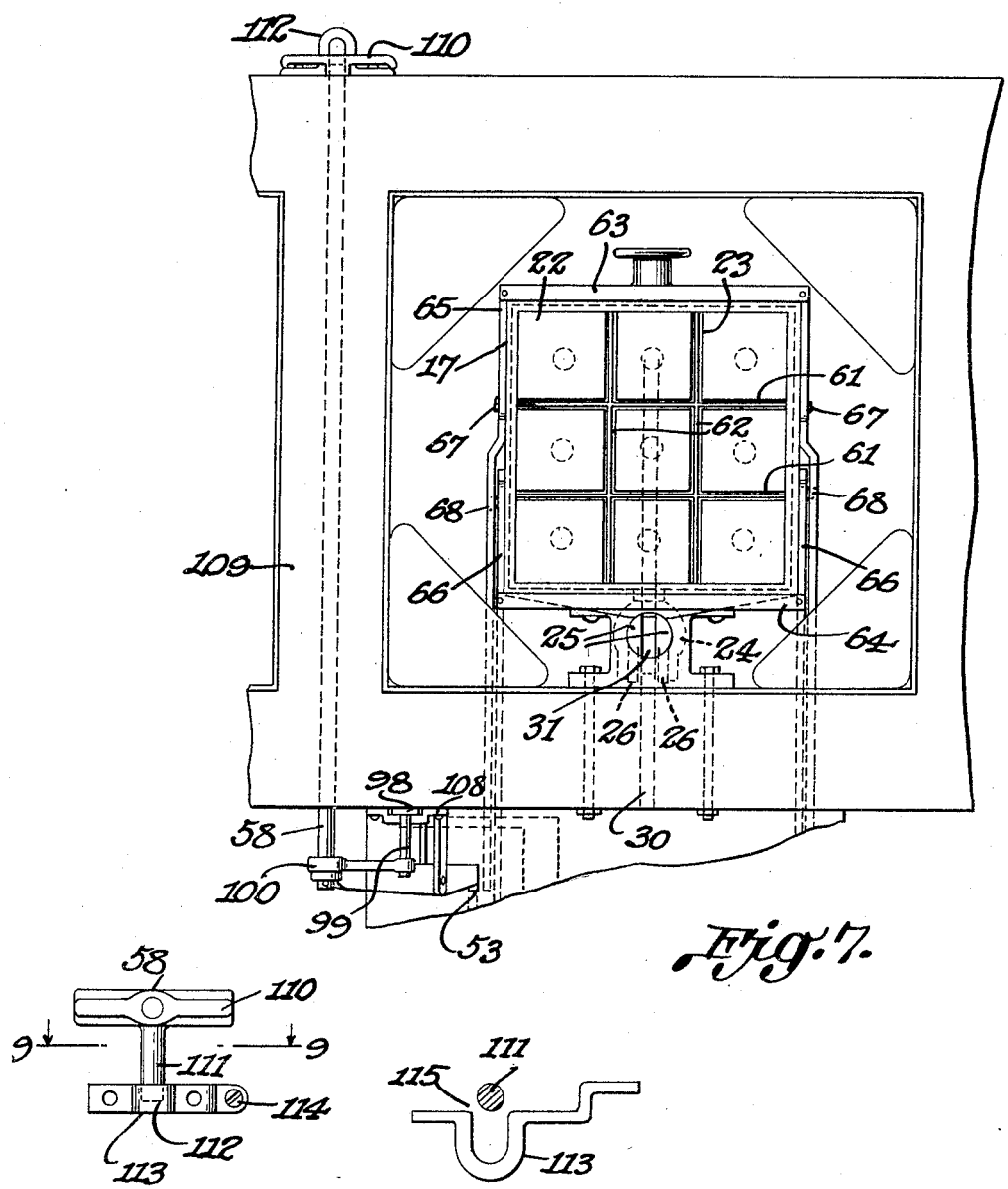
Fig. 7 is a fragmentary plan view of the invention.
Fig. 8 is a side view of the control lever.
Fig. 9 is a section taken on line 9—9 of Fig. 8.

The handle 110 is then pressed in to its normal operative position as shown in Fig. 7 and the motor 89 cut into circuit. The release of this handle permits cooperation of the pawls 47 and 37 with the ratchet 35, and the shaft 48 is driven idly by the motor. Lever 110 is then twisted in one direction to rotate the shaft 58 which through lever 100 moves the clutch block 90 into engagement with the companion clutch member 92 operating the cam 47, which cam cooperates with the lever 41 and pawl 36 rotating the ratchet 35 and coincidently the sprocket 34 through the distance of one tooth on the ratchet 35, raising the platen through the chain 30 a predetermined distance, according to the diameter of the sprocket and the number of teeth in the ratchet. This cam 47 is driven through one half revolution when the beveled lug 104 cooperates with the beveled lug 103 on the lever 94, forcing the lever 94 and coincidently the clutch block 90 to neutral position. As the block of ice cream is forced upwardly by the platen 22, it is forced through the opening in the head with intervening knives 61 and 62, which slit the block of ice cream longitudinally into a plurality of rectangular sections of equal area.

The handle 110 is then twisted in the opposite direction to that previously applied, which moves the clutch block 90 into cooperation with the companion member 93, driving the cam 85, forcing the levers 77 and 78 apart, and through the bars 71 and 72 and levers 65 and 66, forcing the slicing cutters 64 and 63 to the common center 86, thereby slicing off the slit portion of a block of ice cream and forming a plurality of equally dimensionally small bricks of ice cream, ready for insertion in suitable cornucopia or ready for mounting on suitable sticks for dipping in chocolate or other coating material.

From the above it will be noted that the device is adapted to move a body of ice cream bodily within a container and cut the ice cream longitudinally and transversely into a multiplicity of portions, and that safety means is provided against operation of the slicing cutters during loading and cleaning of the machine.

It will be understood that variations in the construction and arrangement of parts which are consistent with the appended claims may be resorted to without detracting from the spirit or scope of the invention or sacrificing any of the advantages thereof.

I claim:—

1. An ice cream dispenser comprising a container, a longitudinally movable platen in said container, means for moving said platen, slitting means operable in the longitudinal plane of the container and slicing means operable in a plane transversely of the container, driving means for said platen and for said slicing means, said driving means being automatically disengageable at the completion of each operation.

2. An ice cream dispenser comprising a container, a longitudinally movable platen in said container, means for moving said platen, slitting means operable in the longitudinal plane of the container and slicing means operable in a plane transversely of the container, said platen being moved in a series of consecutive steps alternated by operation of the slicing means, driving means for said platen and for said slicing means, said driving means being automatically disengageable at the completion of each operation.

3. An ice cream dispenser comprising a container, a longitudinally moveable platen in said container, means for moving said platen, slitting means operable in the longitudinal plane of the container and slicing means operable in a plane transversely of the container, said platen being moved in a series of consecutive steps alternated by operation of the slicing means, a hopper for said container, and means for securing the container against movement within the hopper, driving means for said platen and for said slicing means, said driving means being automatically disengageable at the completion of each operation.

4. An ice cream dispenser comprising a container, a longitudinally movable platen in said container, means for moving said platen, slitting means operable in the longitudinal plane of the container and slicing means operable in a plane transversely of the container, a hopper for said container, a detachable head for said hopper, said container being secured against movement within the hopper by said head, said head having an opening formed therethrough coextensive with the inside of the container, said platen being moved in a series of consecutive steps alternated by operation of the slicing means, driving means for said platen and for said slicing means, said driving means being automatically disengageable at the completion of each operation.

5. An ice cream dispenser comprising a container, a longitudinally movable platen in said container, means for moving said platen, slitting means operable in the longitudinal plane of the container and slicing means operable in a plane transversely of the container, a hopper for said container, a detachable head for said hopper, said container being secured against movement within the hopper by said head, said head having an opening formed therethrough coextensive with the inside of the container, said slitting means consisting of cutting elements spanning the opening in the head, whereby, when the platen moves a body of ice cream through the opening, the body is coincidently slit into a plurality of longitudinal sections, said platen being moved in a series of consecutive steps alternated by operation of the slicing means, driving means for said platen and for said slicing means, said driving means being automatically disengageable at the completion of each operation.

6. An ice cream dispenser comprising a container, a longitudinally movable platen in said container, means for moving said platen, slitting means operable in the longitudinal plane of the container and slicing means operable in a plane transversely of the container, said platen being moved in a series of consecutive steps alternated by operation of the slicing means, driving means for said platen and for said slicing means, said driving means being automatically disengageable at the completion of each operation, and means for locking said slicing means against cooperation with the driving means when the driving means for the platen is made inoperative.

7. An ice cream dispenser comprising a container, a longitudinally movable platen in said container, means for moving said platen, slitting means operable in the longitudinal plane of the container and slicing means operable in a plane transversely of the container, a hopper for said container, a detachable head for said hopper, said container being secured against movement within the hopper by said head, said head having an opening formed therethrough coextensive with the inside of the container, said slitting means consisting of cutting elements spanning the opening in the head, whereby, when the platen moves a body of ice cream through the opening, the body is coincidently slit into a plurality of longitudinal sections, said platen being moved in a series of consecutive steps alternated by operation of the slicing means, driving means for said platen and for said slicing means, said driving means being automatically disengageable at the completion of each operation, and means for locking said slicing means against cooperation with the driving means when the driving means for the platen is made inoperative.

In testimony whereof I affix my signature.

AXEL JOHNSON.